July 7, 1970

S. M. KAVIEFF 3,518,946

PUSHER CONVEYOR FOR WHEELED CARRIERS

Filed Jan. 24, 1968

INVENTOR
SHELDEN M. KAVIEFF
BY
Farley, Forster & Farley
ATTORNEYS

July 7, 1970 S. M. KAVIEFF 3,518,946
PUSHER CONVEYOR FOR WHEELED CARRIERS
Filed Jan. 24, 1968 3 Sheets-Sheet 2

INVENTOR
SHELDEN M. KAVIEFF
BY Farley, Forster & Farley
ATTORNEYS

July 7, 1970  S. M. KAVIEFF  3,518,946
PUSHER CONVEYOR FOR WHEELED CARRIERS
Filed Jan. 24, 1968  3 Sheets-Sheet 3
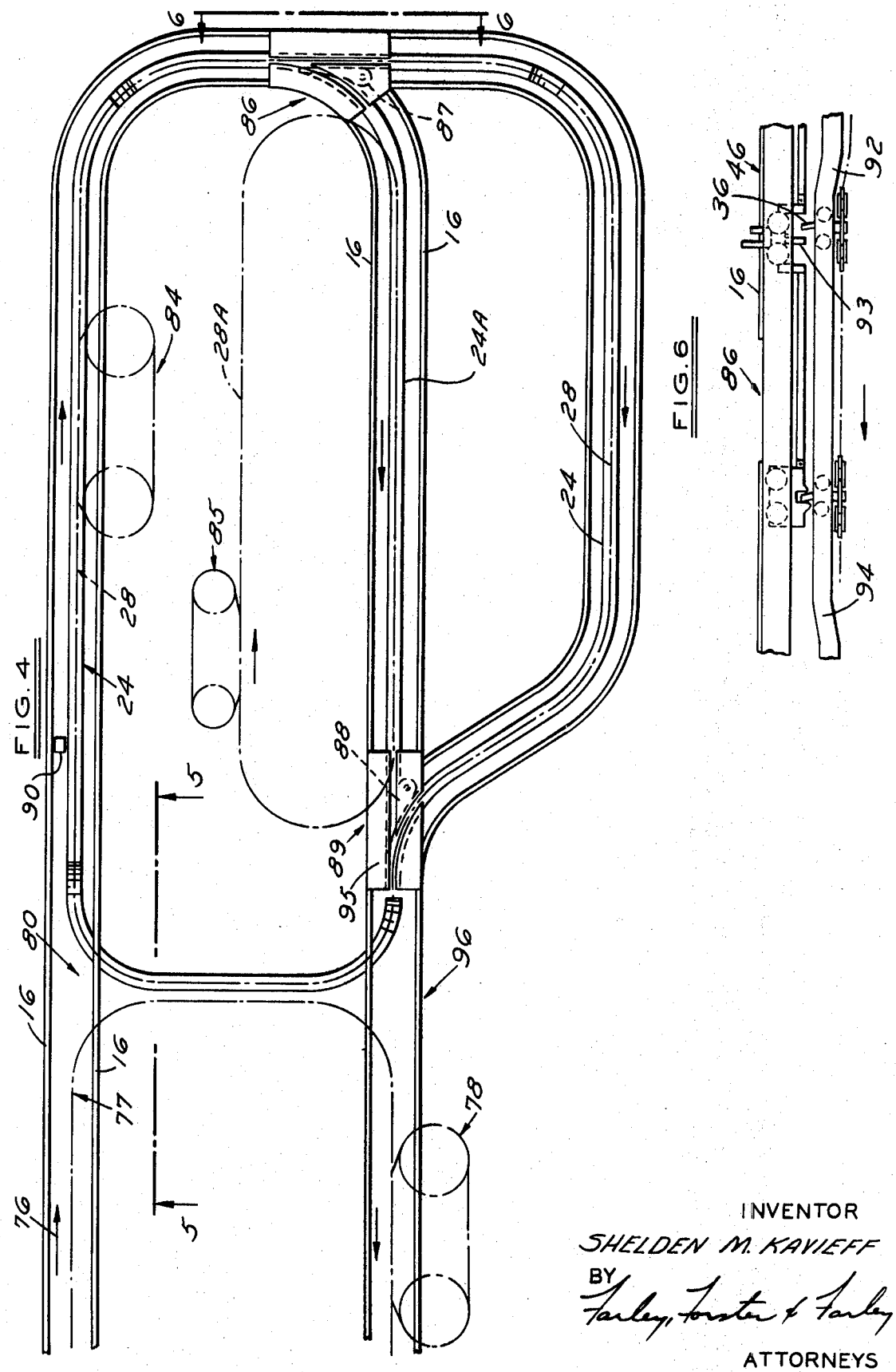
INVENTOR
SHELDEN M. KAVIEFF
BY
Farley, Forster & Farley
ATTORNEYS

United States Patent Office 3,518,946
Patented July 7, 1970

3,518,946
PUSHER CONVEYOR FOR WHEELED CARRIERS
Shelden M. Kavieff, Farmington, Mich., assignor to Jervis B. Webb Company, a corporation of Michigan
Filed Jan. 24, 1968, Ser. No. 700,086
Int. Cl. B61b 13/00
U.S. Cl. 104—172                            15 Claims

ABSTRACT OF THE DISCLOSURE

A conveyor for wheeled carriers wherein a tow trolley unit, supported on a track intermediate the track of a pusher conveyor and the support for the carriers, has a releasable driving dog engageable by a pusher of the pusher conveyor and a drive member engageable with a driven member on a carrier to transmit movement from the pusher conveyor to the carrier. The releasable driving dog is movable to non-driving position to stop and accumulate the tow trolley units and carriers, and means are provided for transferring a carrier between a conventional pusher line and a tow trolley unit, and for transferring a tow trolley unit and carrier between pusher lines.

BACKGROUND OF THE INVENTION

Field of the invention

This invention relates to a conveyor of the pusher or tow line type for propelling wheeled carriers such as trucks across a supporting surface with provision for stopping and accumulating carriers, and for switching and transferring carriers from one pusher conveyor to another.

Description of the prior art

In prior conveyors of this general type, the stopping and accumulation of carriers has been obtained by some form of mechanism for disengaging the driving member of a carrier from a pusher propelling the carrier. This mechanism is installed either on all carriers, or on all pushers of the system. The switching and transfer of carriers may also require the installation of other special equipment on all carriers of the system.

The present invention has particular utility in instances where these features of stopping, accumulating, switching and transfer of carriers may be required only in a portion of a system, and enables these features to be obtained in any desired combination without the installation of specialized equipment on the carriers or pushers of the system as a whole.

SUMMARY OF THE INVENTION

The invention provides a conveyor for propelling a carrier along a carrier support, comprising the combination of a pusher conveyor including a track mounted in spaced relation to the carrier support, a driven propelling member with pushers thereon movably carried by the track; and a tow trolley unit supported by track structure mounted adjacent to the pusher conveyor and the carrier support, the tow trolley unit having a releasable driving dog engageable by a pusher of the pusher conveyor and having motion transmitting means engageable with the carrier.

Preferably the motion transmitting means between the tow trolley unit and the carrier is arranged to impart both driving and guiding movement from the tow trolley unit to the carrier so that the carrier is caused to follow the path of travel defined by the track structure supporting the tow trolley unit.

The tow trolley unit has a length slightly in excess of the length of the carrier, and may consist of a plurality of trolleys interconnected by tow bars. In the preferred construction to be described herein, the track structure on which the tow trolley unit travels is arranged below the carrier support and above the pusher conveyor track and in vertical alignment therewith. The front trolley of the tow trolley unit is equipped with the releasable driving dog which depends downwardly for engagement by an upwardly projecting pusher of the pusher conveyor; and, this releasable driving dog may be moved from a driving to a non-driving position relative to a pusher by a stopping device or by engagement with a member projecting rearwardly from the rear trolley of a preceding tow trolley unit.

Provision is made for switching and transferring a tow trolley unit and carrier propelled thereby from one pusher conveyor to another pusher conveyor; also, for transferring a carrier between a pusher conveyor and a tow trolley unit.

Other features and advantages of the invention will appear from the description to follow of the preferred embodiment disclosed in the accompanying drawings.

DESCRIPTION OF THE DRAWING

FIG. 4 is a schematic plan view representative of an installation wherein the tow trolley conveyor of the invention forms a part of a pusher conveyor system;

FIG. 5 is a schematic elevation, taken as indicated by the line 5—5 of FIG. 4, showing the transfer between a conventional pusher conveyor and the tow trolley conveyor of the invention; and FIG. 6 is a schematic elevation on the line 6—6 of FIG. 4 of a branch line junction in the tow trolley conveyor.

DESCRIPTION OF THE PREFERRED EMBODIMENTS

Figure 1:
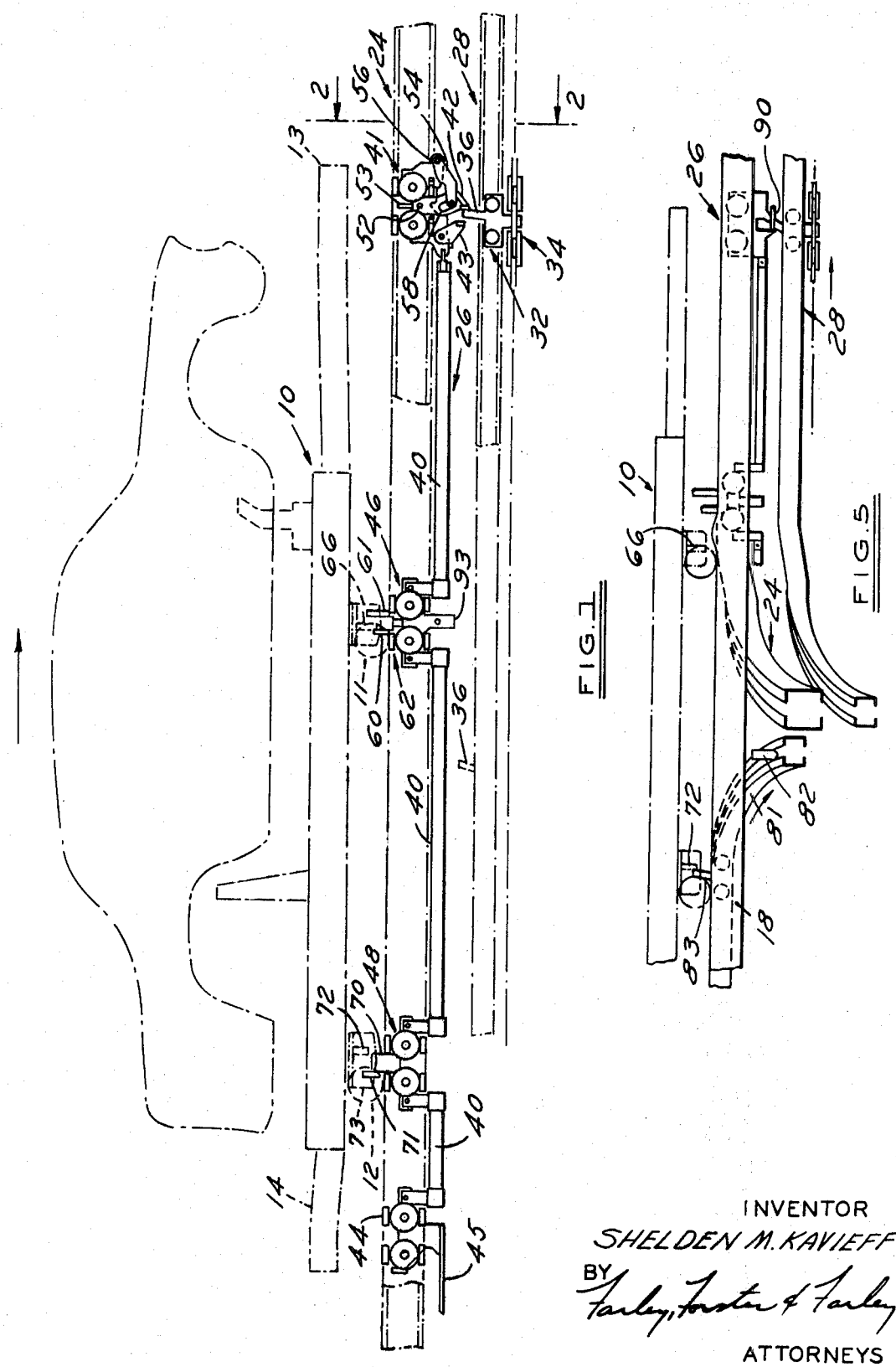
FIG. 1 is a schematic side elevation showing the relation between a carrier, a tow trolley unit and a pusher conveyor.
Figure 2:
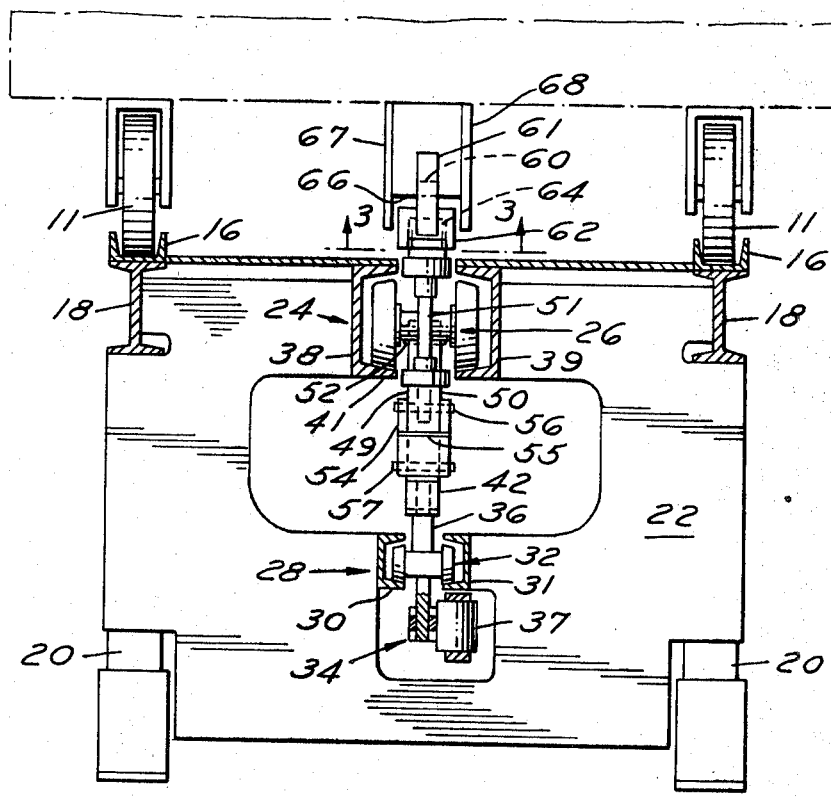
FIG. 2 is an enlarged sectional elevation taken as indicated by the line 2—2 of FIG. 1.
Figure 3:
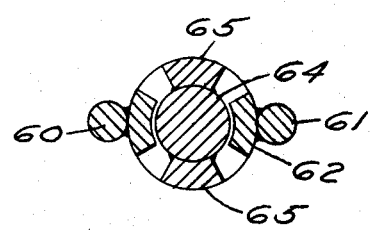
FIG. 3 is an enlarged sectional detail on the line 3—3 of FIG. 2.

FIGS. 1-3 illustrate the basic construction of the conveyor of the invention. A carrier 10 having pairs of front and rear wheels 11 and 12 and front and rear extension bumpers 13 and 14 travels on a support provided by upwardly facing channel members 16, although the support may be formed by a plane surface, if desired. In the construction illustrated, the members 16 are each secured to a beam 18 mounted above floor level on a suitable frame work which includes upright members 20 and track supporting plates 22.

Track structure 24 for a tow trolley unit 26 is mounted below the carrier supports 16, and a pusher or tow line conveyor generally designated 28 is mounted below and in vertically centered alignment with the track structure 24.

The pusher conveyor 28 includes a track formed by a pair of transversely spaced parallel rails 30 and 31, a plurality of trolleys 32 mounted on the rails, an endless driven propelling chain 34 connected to the trolleys 32, upwardly projecting pushers 36 provided on at least some of the trolleys at intervals along the chain. The chain 34 may be guided around horizontal curves by rollers 37.

The tow trolley unit 26 is made up of a plurality of trolleys supported on the track members 38 and 39 of the track structure 24 and interconnected by tow bars 40, four such trolleys being employed in the construction illustrated to provide an overall length for a tow trolley unit slightly in excess of the length of a carrier. These trolleys include a front trolley 41 equipped with a depending driving dog 42 and hold back dog 43; a rear trolley 44 equipped with a rearwardly extending driving dog releasing cam 45; and forward and rearward carrier driving and guiding trolleys 46 and 48, respectively.

The driving dog 42 of the front trolley 41 is releasable, being movable between driving and non-driving positions relative to a pusher 36, this dog 42 being attached to a pair of plates 49 and 50 which straddle the body 51 of the trolley 41 and are connected by a pin 52 engaging a vertical slot 53 in the trolley body. A releasing lever 54 formed by a pair of plates interconnected by a cam plate 55 is mounted on a pivot 56 at the forward end of the trolley body and has a transverse pin 57 engaging a slot 58 in the driving dog plates 49 and 50. Clockwise pivotal movement of the releasing lever 54 as viewed in FIG. 1, such as produced by the cam plate 55 engaging the cam 45 on the rear trolley 44 of a preceding tow trolley unit, will move the driving dog 42 upwardly to a released or non-driving position relative to a pusher 36. Releasing movement can also be obtained by a suitable stop member mounted along the track structure and movable into a position for engagement by the driving dog 42 or releasing lever 54.

Means for transmitting motion of the tow trolley unit to the carrier is provided on the forward driving and guiding trolley 46 of the tow trolley unit and may be supplemented on the rearward trolley 48 thereof. The trolley 46 is equipped with upwardly projecting driving and hold back members 60 and 61 secured to a cylindrical center guide 62 which is pivoted on an upwardly projecting pin 64. As shown in FIG. 3, pivotal movement of the center guide 62 is limited by lugs 65 secured to the pin 64. The carrier 10 is provided intermediate its forward wheels 11 with a depending driven member 66 mounted between a pair of guide plates 67 and 68 which extend downwardly and straddle the center guide 62 on the trolley 46. The hold back member 61 on the trolley 46 is longer than the driving member 60, having greater overlapping engagement with the driven member 66 on the carrier for positive stopping action.

A center guide 70 is carried by the rearward trolley 48 and may be mounted for movement about a pivotal axis normal to the plane defined by the tow trolley track structure 24 in a manner similar to the front guide 62. In the construction illustrated, the rearward trolley 48 is also equipped with a supplemental driving member 71 engageable with a supplemental driven member 72 on the carrier, the driven member 72 being mounted between a pair of guide plates 73 which straddle the guide 70. The supplemental driving member 71 trails the supplement driven member 72 a distance sufficient to compensate for any difference in the chording action of the carrier and the tow bar connecting the forward and rearward trolleys 46 and 48 so that ordinarily there is no engagement between these driving and driven members 71 and 72.

FIGS. 4–6 illustrate the conveyor of the invention employed as part of a pusher conveyor system. In FIG. 4 carriers 10 enter at the upper left hand corner of the view propelled in the direction of the arrow 76 by a conventional pusher conveyor 77, similar to the pusher conveyor 28 previously described, driven by a drive unit 78. At a transfer zone 80, the track 81 of the pusher conveyor 77 curves downwardly and under the inside beam 18 supporting the carrier channels 16, as shown in FIG. 5, disengaging a pusher 82 from the front driven member 66 of the carrier, and the supplementary driven member 72 on the carrier is subsequently engaged by a following pusher 83 advancing the carrier through the transfer zone for engagement by a tow trolley unit of the invention.

The track structure 24 in FIG. 4 for the tow trolley units includes a main path and a branch line 24A, the main path including the pusher conveyor 28 following the main path and being driven by a drive unit 84. A separate pusher conveyor 28A, driven by a drive unit 85 is provided for propelling a tow trolley unit and carrier along the branch path 24A. At the entrance junction 86 between the main and branch tow trolley tracks 24 and 24A, a switch 87 is installed for diverting a tow trolley unit to the branch track 24A. A switch 88 is also provided at the return junction 89.

At the transfer zone 80, a tow trolley unit 26 is held in position to receive a carrier 10 by a stop 90 which moves the carrier driving dog 42 to released position, and the construction and operation of this stop 90 may employ principles illustrated and disclosed in U.S. Pat. 3,229,645. A slight hump may be formed in the carrier supporting channels 16 to raise the driven member 66 on the carrier over the driving member 60 of the tow trolley unit. Operation of the stop 90 is controlled by a suitable sensing device (not shown) indicating that the carrier driven member 66 is in proper position between the driving and hold back members 60 and 61. When this condition is satisfied, the stop 90 is released and the driving dog 42 of the tow trolley unit is engaged by the next advancing pusher 36. The tow trolley unit and carrier remain coupled together during travel of the tow trolley unit on the tracks 24 or 24A.

At the junction 86 the tow trolley unit and carrier may be diverted to the branch track 24A by the switch 87. This transfer is accomplished utilizing teachings contained in U.S. Pat. 3,314,377. As shown in FIG. 6, a rise section 92 is provided in the track 28 of the pusher conveyor in advance of the junction 86, this rise section placing a pusher 36 in overlapping driving relation with a supplemental or transfer driving dog 93 on the trolley 46 of the tow trolley unit. A drop section 94 following the junction is employed to place the track 28 of the pusher conveyor in normal spacing with the track 24 of the tow trolley unit. If the tow trolley unit is transferred onto the track 24A, the transfer driving dog 93 will be engaged by a pusher 36, advancing the front trolley 41 of the tow trolley unit into position where its driving dog 42 can be engaged by a pusher of the conveyor 28A.

The channel supports 16 for the wheels of the carrier 10 do not extend through the junction 86 or 89. Instead, the carrier wheels roll on plates 95, the carrier following the tow trolley unit by the combined driving and guiding action of the means described for transmitting motion of the tow trolley unit to the carrier.

A similar rise section is employed in the track of the pusher conveyor 28A in advance of the junction 89 for advancing a tow trolley unit back into engagement by a pusher of the main conveyor 28.

At the carrier transfer zone 96 following the junction 89, the main driven member 66 of the carrier disengages from the tow trolley unit. The supplemental driven member 72 on the carrier is then engaged by the supplemental driving member 71 on the tow trolley unit to advance the carrier 10 through the transfer zone and into position where the main driven member 66 is in position to be engaged by a pusher of the pusher conveyor 77.

Work stations may be established along the path of travel of the tow trolley units and carriers at which a tow trolley unit and carrier coupled therewith may be stopped, and tow trolley units and carriers may be accumulated behind a stopped carrier.

While the conveyor of the invention has been described as forming a portion of a pusher conveyor system, it obviously may be used independently.

I claim:
1. A conveyor comprising:
a carrier and a support on which the carrier is adapted to travel;
a pusher conveyor including a track mounted in spaced relation to the carrier support, a propelling member with pushers thereon movably carried by said track, and means for driving the propelling member;
a tow trolley unit, track structure supporting the tow trolley unit for travel adjacent to the pusher conveyor track and the carrier support, the tow trolley unit having a releasable driving dog engageable by a pusher of the pusher conveyor propelling member; and, means for transmitting motion of the tow trolley unit to the carrier to propel the carrier along the support.

2. A conveyor according to claim 1 wherein the tow trolley unit includes front and rear trolleys mounted on said track structure, tow bar means interconnecting said front and rear trolleys in longitudinally spaced relation, said releasable driving dog being mounted on the front trolley and a dog releasing member mounted on the rear trolley.

3. A conveyor according to claim 1 wherein the track structure supporting the tow trolley unit is mounted above the pusher conveyor track and intermediate said track and the carrier support, means mounting the releasable driving dog on the tow trolley unit for vertical movement between a lower driving position and an upper non-driving position relative to a pusher of the pusher conveyor, and driving dog releasing means carried by the tow trolley unit for moving the releasable driving dog to non-driving position in response to engagement between said releasing means and an object in the path of travel of said tow trolley unit.

4. A conveyor according to claim 1 wherein the means for transmitting motion of the tow trolley unit to the carrier includes a driving member on the tow trolley unit engageable with a driven member on the carrier, and means for limiting relative movement between the driving and driven members in a direction transversely to the direction of movement of the tow trolley unit whereby the carrier is caused to follow the path of travel defined by the track structure supporting the tow trolley unit.

5. A conveyor according to claim 4 wherein the means for limiting relative movement between the driving and driven members includes a pair of transversely spaced guide plates associated with one of said members and a center guide associated with the other of said members and straddled by said guide plates.

6. A conveyor according to claim 5 wherein said pair of guide plates are secured to the carrier on either side of the driven member, said center guide is connected to the driving member on the tow trolley unit, and means mounting the driving member and center guide for rocking movement on an axis normal to the supporting plane defined by the tow trolley unit track structure.

7. A conveyor according to claim 1 wherein the carrier is provided with front and rear supporting wheels, the tow trolley unit having interconnected forward and rearward trolleys, said means for transmitting motion of the tow trolley unit to the carrier including a driving member on said forward trolley of the tow trolley unit engageable with a driven member mounted on the carrier adjacent the front wheels thereof, front guide means associated with said driving and driven members for limiting relative movement therebetween in a direction transverse to the direction of tow trolley movement, and rear guide means on the rearward trolley and on the carrier for limiting relative movement between the tow trolley unit and the carrier in a direction transverse to the direction of movement of the tow trolley unit.

8. A conveyor according to claim 7 wherein a supplementary driving member is carried by the rearward trolley of the tow trolley unit for engagement with a supplementary driven member mounted on the carrier.

9. A conveyor according to claim 1 wherein the means for transmitting motion of the tow trolley unit to the carrier includes the combination of a driving member, a driven member and a hold back member.

10. A conveyor according to claim 9 wherein the driving and hold back members are secured to the tow trolley unit, the hold back member projecting toward the carrier a distance greater than the driving member.

11. A conveyor according to claim 1 further comprising a second pusher conveyor, the track structure supporting the tow trolley unit extending between said first and second pusher conveyors, and means for transferring a tow trolley unit from the first to the second pusher conveyor.

12. A conveyor according to claim 11 wherein the means for transferring the tow trolley unit includes a transfer driving dog mounted on the tow trolley unit in trailing relation to said releasable driving dog, said transfer driving dog being engageable by a pusher of the pusher conveyor only at a reduced spacing between the pusher conveyor track and tow trolley unit track structure.

13. A conveyor according to claim 11 wherein the means for transferring the tow trolley unit from the first to the second pusher conveyor includes switch means provided in the track structure supporting the tow trolley unit.

14. A conveyor according to claim 1 further comprising a second pusher conveyor, the carrier support extending between the first and second pusher conveyors, the track of the second pusher conveyor being mounted so that a pusher of the second pusher conveyor is engageable with the driven member on the carrier, and means for transferring a carrier between the second pusher conveyor and the tow trolley unit.

15. A conveyor according to claim 14 wherein the means for transferring a carrier includes a supplemental driven member mounted thereon.

References Cited

UNITED STATES PATENTS

| | | | |
|---|---|---|---|
| 3,229,645 | 1/1966 | Dehne | 104—172 |
| 3,314,377 | 4/1967 | Dehne | 104—172 |
| 3,375,790 | 4/1968 | Bishop | 104—172 |
| 3,435,780 | 4/1969 | Czarnecki et al. | 104—172 |

GEORGE E. A. HALVOSA, Primary Examiner

REEXAMINATION CERTIFICATE (62nd)

United States Patent [19]
Kavieff

[11] B1 3,518,946
[45] Certificate Issued Mar. 22, 1983

[54] PUSHER CONVEYOR FOR WHEELED CARRIERS

[75] Inventor: Shelden M. Kavieff, Farmington, Mich.

[73] Assignee: Jervis B. Webb, Company, Farmington Hill, Mich.

Reexamination Request
No. 90/000,059, Aug. 21, 1981

Reexamination Certificate for:
Patent No.: 3,518,946
Issued: Jul. 7, 1970
Appl. No.: 700,086
Filed: Jan. 24, 1968

[51] Int. Cl.³ ............................................. B61B 13/00
[52] U.S. Cl. ..................................................... 104/172 B
[58] Field of Search ........................... 104/172 R, 172 H, 104/172 BT, 172 S, 139, 140

[56] Reference Cited

U.S. PATENT DOCUMENTS

| | | |
|---|---|---|
| 3,179,064 | 4/1965 | Dehne. |
| 3,229,645 | 1/1966 | Dehne. |
| 3,314,377 | 4/1967 | Dehne. |
| 3,375,790 | 4/1968 | Bishop. |
| 3,404,636 | 10/1968 | Kavieff. |
| 3,435,780 | 4/1969 | Czarnecki et. al. ............... 104/172 |

FOREIGN PATENT DOCUMENTS 41-21063  10/1966  Japan.

OTHER PUBLICATIONS

Anchor Conveyors AD—"Automation" Vol. 12, No. 12—Dec. 1965.

*Primary Examiner*—George E. A. Halvosa

[57] ABSTRACT

A conveyor for wheeled carriers wherein a tow trolley unit, supported on a track intermediate the track of a pusher conveyor and the support for the carriers, has a releasable driving dog engageable by a pusher of the pusher conveyor and a drive member engageable with a driven member on a carrier to transmit movement from the pusher conveyor to the carrier. The releasable driving dog is movable to non-driving position to stop and accumulate the tow trolley units and carriers, and means are provided for transferring a carrier between a conventional pusher line and a tow trolley unit, and for transferring a tow trolley unit and carrier between pusher lines.

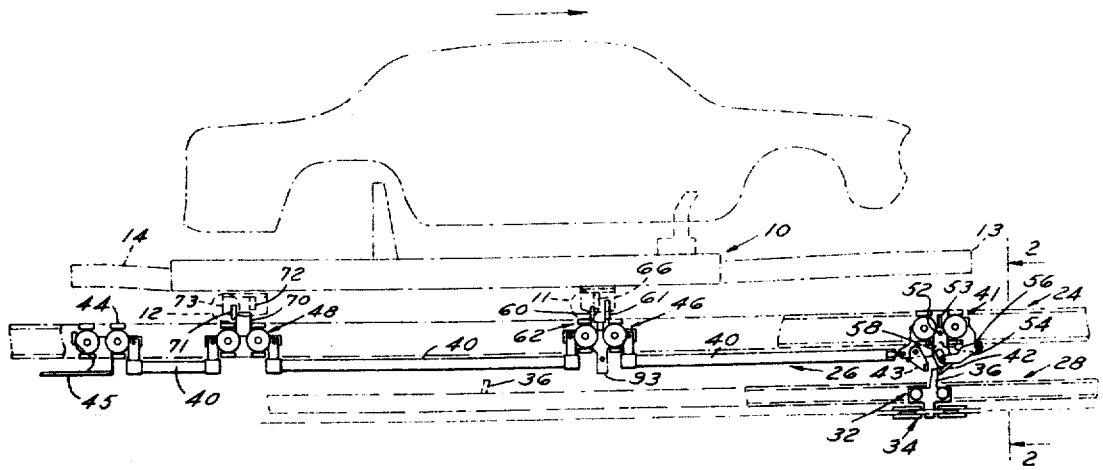

REEXAMINATION CERTIFICATE ISSUED UNDER 35 U.S.C. 307.

THE PATENT IS HEREBY AMENDED AS INDICATED BELOW.

Matter enclosed in heavy brackets appeared in the patent, but has been deleted and is no longer a part of the patent; matter printed in italics indicates additions made to the patent.

AS A RESULT OF REEXAMINATION IT HAS BEEN DETERMINED THAT:

Claims 1, 3–8, 14 and 15, having been finally determined to be unpatentable, are cancelled.

Claims 2, 9 and 11 are determined to be patentable as amended:

2. A conveyor according to claim [1] *16* wherein the tow trolley unit includes front and rear trolleys mounted on said track structure, tow bar means interconnecting said front and rear trolleys in longitudinally spaced relation, said [releasable] driving dog being mounted on the front trolley and [a] *said driving* dog releasing member *being* mounted on the rear trolley.

9. A conveyor according to claim [1] *16* wherein the means for transmitting motion of the tow trolley unit to the carrier includes the combination of a driving member, a driven member and a hold back member.

11. A conveyor according to claim [1] *16* further comprising a second pusher conveyor, the track structure supporting the tow trolley unit extending between said first and second pusher conveyors, and means for transferring a tow trolley unit from the first to the second pusher conveyor.

Claims 10, 12 and 13, dependent on amended claims, are determined to be patentable.

New claims 16–21 are added and determined to be patentable.

*16. A conveyor comprising:*

*a carrier and a support on which the carrier is adapted to travel;*

*a pusher conveyor including a track mounted in spaced relation to the carrier support, a propelling member with pushers thereon movably carried by said track, and means for driving the propelling member;*

*a tow trolley unit, track structure supporting the tow trolley unit for travel adjacent to the pusher conveyor track and the carrier support, the track structure supporting the tow trolley unit being mounted above the pusher conveyor track and intermediate said track and the carrier support, the tow trolley unit having a releasable driving dog engageable by a pusher of the pusher conveyor propelling member, means mounting the releasable driving dog on the tow trolley unit for verticial movement between a lower driving position and an upper non-driving position relative to a pusher of the pusher conveyor; driving dog releasing means carried by the tow trolley unit for moving the releasable driving dog to non-driving position in response to engagement between said releasing means and an object in the path of travel of said tow trolley unit; and, means for transmitting motion of the tow trolley unit to the carrier to propel the carrier along the support.*

*17. A conveyor comprising:*

*a carrier and a support on which the carrier is adapted to travel;*

*a pusher conveyor including a track mounted in spaced relation to the carrier support, a propelling member with pushers thereon movably carried by said track, and means for driving the propelling member;*

*a tow trolley unit, track structure supporting the tow trolley unit for travel adjacent to the pusher conveyor track and the carrier support, the tow trolley unit having a releasable driving dog engageable by a pusher of the pusher conveyor propelling member; and, means for transmitting motion of the tow trolley unit to the carrier to propel the carrier along the support, the means for transmitting motion of the tow trolley unit to the carrier including a driving member on the tow trolley unit engageable with a driven member on the carrier, and means for limiting relative movement between the driving and driven members in a direction transversely to the direction of movement of the tow trolley unit whereby the carrier is caused to follow the path of travel defined by the track structure supporting the tow trolley unit, the means for limiting movement between the driving and driven members including a pair of transversely spaced guide plates secured to the carrier on either side of the driven member, a center guide connected to the driving member on the tow trolley unit and straddled by said guide plates, and means mounting the driving member and center guide for rocking movement on an axis normal to the supporting plane defined by the tow trolley unit track structure.*

*18. A conveyor comprising:*

*a carrier and a support on which the carrier is adapted to travel, the carrier being provided with front and rear supporting wheels;*

*a pusher conveyor including a track mounted in spaced relation to the carrier support, a propelling member with pushers thereon movably carried by said track, and means for driving the propelling member;*

*a tow trolley unit having interconnected forward and rearward trolleys, track structure supporting the tow trolley unit for travel adjacent to the pusher conveyor track and the carrier support, the tow trolley unit having a releasable driving dog engageable by a pusher of the pusher conveyor propelling member; and means for transmitting motion of the tow trolley unit to the carrier to propel the carrier along the support, said means for transmitting motion of the tow trolley unit to the carrier including a driving member on said forward trolley of the tow trolley unit engageable with a driven member mounted on the carrier adjacent the front wheels thereof, front guide means associated with said driving and driven members for limiting relative movement therebetween in a direction transverse to the direction of tow trolley movement, and rear guide means on the rearward trolley and on the carrier for limiting relative movement between the tow trolley unit and the* carrier in a direction transverse to the direction of movement of the tow trolley unit.

19. A conveyor according to claim 18 wherein a supplementary driving member is carried by the rearward trolley of the tow trolley unit for engagement with a supplementary driven member mounted on the carrier.

20. A conveyor comprising:
a carrier and a support on which the carrier is adapted to travel;
a pusher conveyor including a track mounted in spaced relation to the carrier support, a propelling member with pushers thereon movably carried by said track, and means for driving the propelling member;
a tow trolley unit, track structure supporting the tow trolley unit for travel adjacent to the pusher conveyor track and the carrier support, the tow trolley unit having a releasable driving dog engageable by a pusher of the pusher conveyor propelling member;
means for transmitting motion of the tow trolley unit to the carrier to propel the carrier along the support;
a second pusher conveyor, the carrier support extending between the first and second pusher conveyors, the track of the second pusher conveyor being mounted so that a pusher of the second pusher conveyor is engageable with the driven member on the carrier, and means for transferring a carrier between the second pusher conveyor and the tow trolley unit.

21. A conveyor according to claim 20 wherein the means for transferring a carrier includes a supplemental driven member mounted thereon.

* * * * *